US012614182B2

(12) United States Patent
Braendgaard et al.

(10) Patent No.: US 12,614,182 B2
(45) Date of Patent: Apr. 28, 2026

(54) METHOD FOR MULTI-PARTY BLOCKCHAIN TRANSACTION AUTHORIZATION BASED ON REAL-TIME DUE DILIGENCE

(71) Applicant: Notabene, Inc., Brooklyn, NY (US)

(72) Inventors: Pelle Steffen Braendgaard, Zürich (CH); Andrés Junge, Peñalolén (CL); Richard Crosby, Berlin (DE)

(73) Assignee: Notabene, Inc., Brooklyn, NY (US)

( * ) Notice: Subject to any disclaimer, the term of this patent is extended or adjusted under 35 U.S.C. 154(b) by 0 days.

(21) Appl. No.: 19/060,231

(22) Filed: Feb. 21, 2025

(65) Prior Publication Data

US 2025/0265590 A1 Aug. 21, 2025

Related U.S. Application Data

(60) Provisional application No. 63/644,699, filed on May 9, 2024, provisional application No. 63/556,275, filed on Feb. 21, 2024.

(51) Int. Cl.
*G06Q 20/40* (2012.01)
*G06Q 20/02* (2012.01)
(52) U.S. Cl.
CPC ......... *G06Q 20/4016* (2013.01); *G06Q 20/02* (2013.01); *G06Q 20/4014* (2013.01)
(58) Field of Classification Search
CPC ............................................. G06Q 20/00–425
See application file for complete search history.

(56) References Cited

U.S. PATENT DOCUMENTS

| | | | | |
|---|---|---|---|---|
| 9,805,338 B1 * | 10/2017 | Ghosn | .................... | G06Q 30/08 |
| 2013/0132275 A1 * | 5/2013 | Enzaldo | ................. | G06Q 20/10 |
| | | | | 705/44 |
| 2018/0189789 A1 | 7/2018 | Caldera | | |
| 2020/0045020 A1 | 2/2020 | Soundararajan et al. | | |

(Continued)

OTHER PUBLICATIONS

International Search Report and Written Opinion for International Application No. PCT/US25/16846; mailed on May 21, 2025; 15 pages.

(Continued)

*Primary Examiner* — Mohammad A. Nilforoush
(74) *Attorney, Agent, or Firm* — Run8 Patent Group, LLC; Peter Miller; Madison Tyrcha

(57) ABSTRACT

A method includes: receiving a first message from a first agent, the first message comprising a request to transfer a virtual asset to a recipient identifier, associated with a second agent, from a sender identifier associated with a sender blockchain address; for the first agent, accessing a set of policies and a set of transaction characteristics of transactions associated with the first agent; characterizing a compliance state and a risk profile of the first agent based on the set of policies and the set of transaction characteristics; transmitting a second message to the second agent, the second message including the compliance state of the first agent and the risk profile of the first agent; receiving confirmation from the second agent to proceed with transfer based on the first compliance state and the first risk profile; and releasing a recipient blockchain address associated with the recipient identifier to the first agent.

16 Claims, 6 Drawing Sheets

(56) References Cited

U.S. PATENT DOCUMENTS

| 2020/0127812 | A1 | 4/2020 | Schuler et al. |
| 2021/0192526 | A1 | 6/2021 | Kuchar et al. |
| 2022/0230147 | A1 | 7/2022 | Wright et al. |

OTHER PUBLICATIONS

Notification of the International Application Number and of the International Filing Date for International Application No. PCT/US25/16846; mailed on Mar. 6, 2025; 1 page.

\* cited by examiner

METHOD FOR MULTI-PARTY BLOCKCHAIN TRANSACTION AUTHORIZATION BASED ON REAL-TIME DUE DILIGENCE

CROSS-REFERENCE TO RELATED APPLICATIONS

This application claims the benefit of U.S. Provisional Application No. 63/644,699, filed on 9 May 2024, and U.S. Provisional Application No. 63/556,275, filed on 21 Feb. 2024, each of which is incorporated in its entirety by this reference.

This Application is related to U.S. patent application Ser. No. 18/949,310, filed on 15 Nov. 2024, which claims the benefit of U.S. Provisional Application No. 63/599,971, filed on 16 Nov. 2023, each of which is incorporated in its entirety by this reference.

TECHNICAL FIELD

This invention relates generally to the field of communications security and more specifically to a new and useful method for multi-party blockchain transaction authorization based on real-time due diligence within the field of communications security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
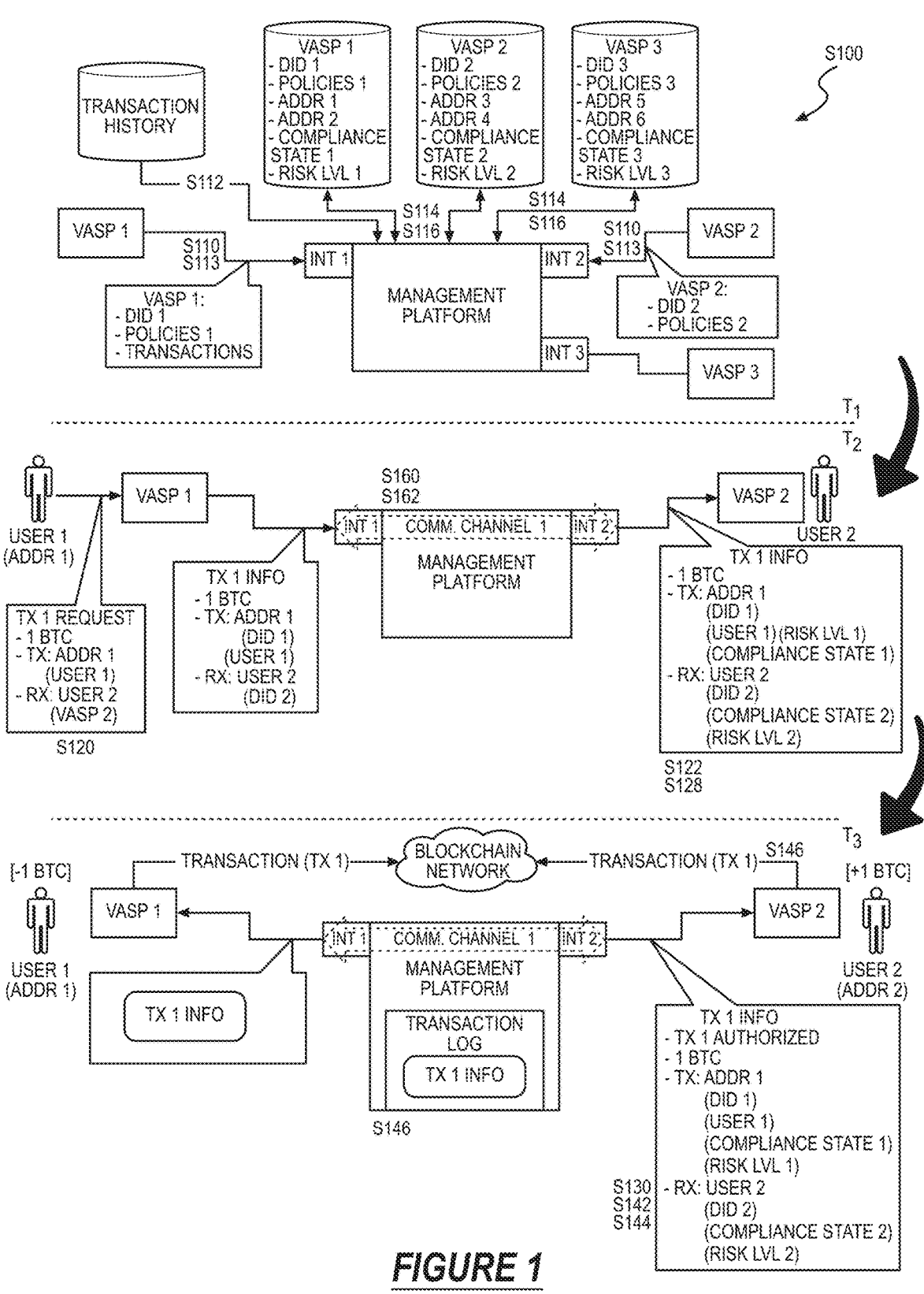
FIG. 1 is a flowchart representation of a method.
Figure 2:
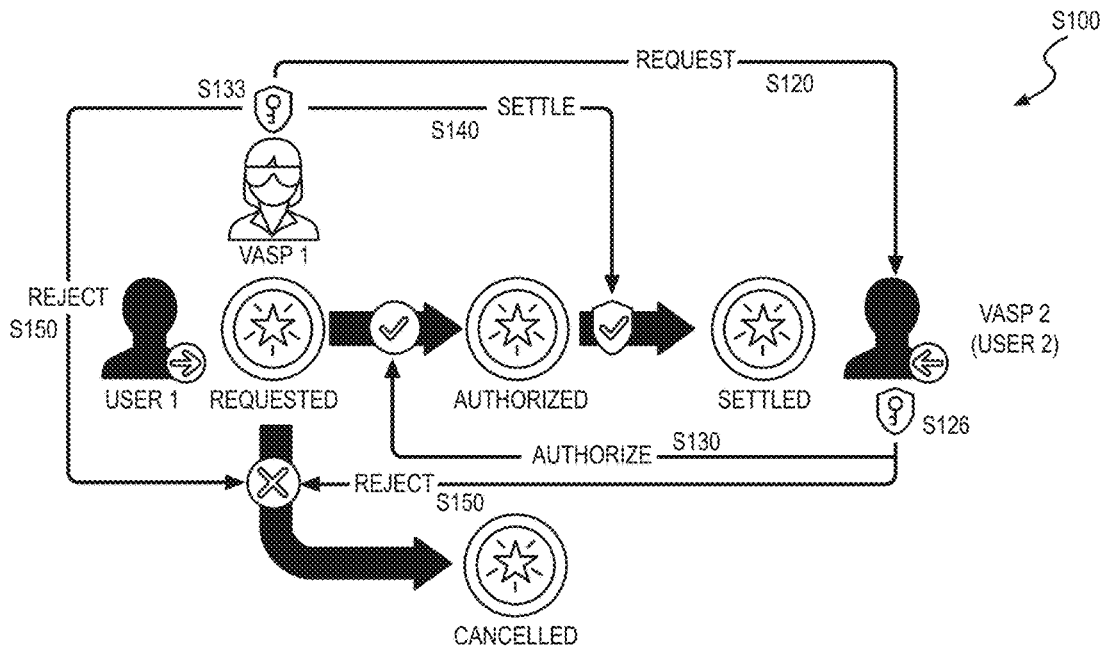
FIG. 2 is a flowchart representation of one variation of the method.
Figure 2:
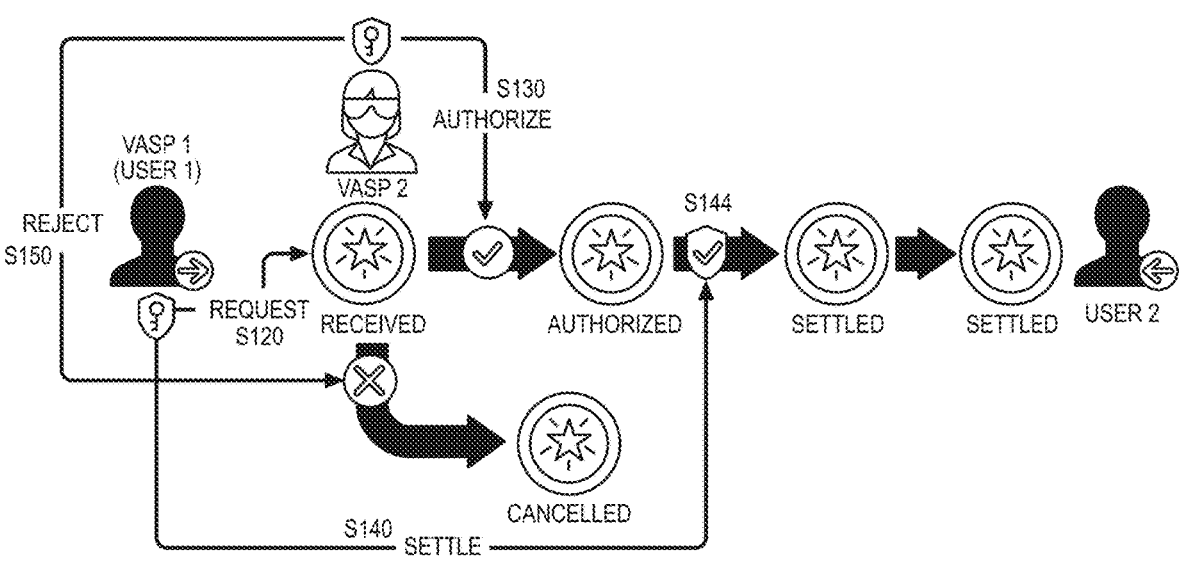

As shown in FIG. 1, a method S100 includes, for each agent in a set of agents: accessing a set of policies implemented by the agent in Block S110; accessing a set of transaction characteristics of transactions associated with the agent in Block S112; characterizing a compliance state of the agent based on the set of policies in Block S114; and characterizing a risk profile of the agent based on the set of transaction characteristics in Block S116.

The method S100 further includes: receiving a first message from a first agent in the set of agents, the first message including a request to transfer a first virtual asset to a first recipient identifier from a sender identifier associated with a sender blockchain address in Block S120; identifying a second agent, in the set of agents, associated with the first recipient identifier in Block S122; generating a second message including the request, the sender blockchain address, a first compliance state of the first agent, and a first risk profile of the first agent in Block S124; and transmitting the second message to the second agent in Block S128.

The method S100 further includes: in response to receiving confirmation from the second agent to proceed with transfer of the first virtual asset based on the first compliance state and the first risk profile, generating a third message including the request, an authorization of transfer of the first virtual asset by the second agent, a second compliance state of the second agent, and a second risk profile of the second agent in Block S132; transmitting the third message to the first agent in Block S134; in response to receiving confirmation from the first agent to proceed with transfer of the first virtual asset based on the second compliance state and the second risk profile, accessing a first recipient blockchain address associated with the first recipient identifier in Block S142; and transmitting the second blockchain address to the first agent to enable transfer of the first virtual asset from the sender blockchain address to the first recipient blockchain address in Block S144.

1.1 Variation: Responsive Risk Characterization

Figure 3:
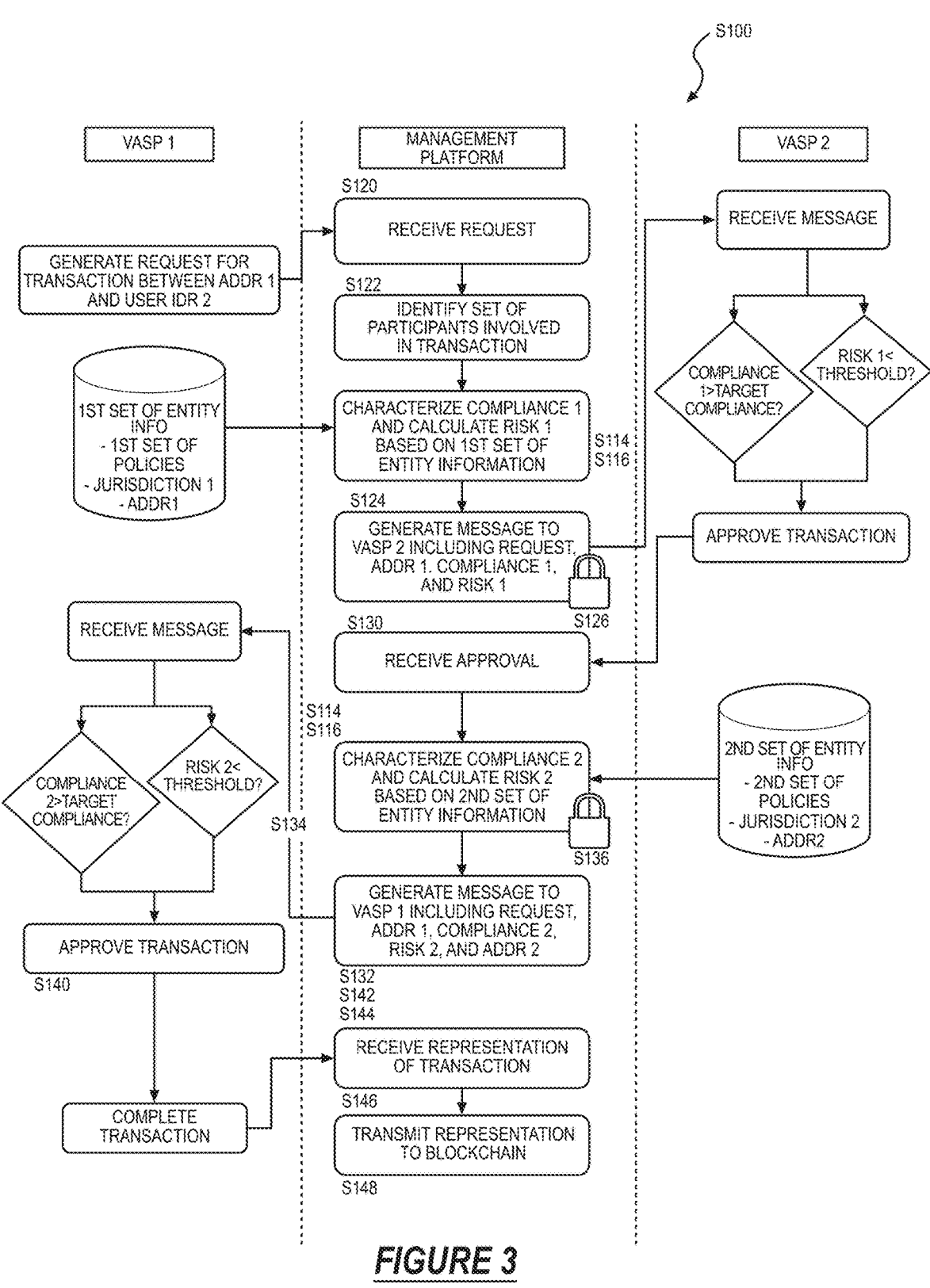
FIG. 3 is a flowchart representation of one variation of the method.
Figure 4:
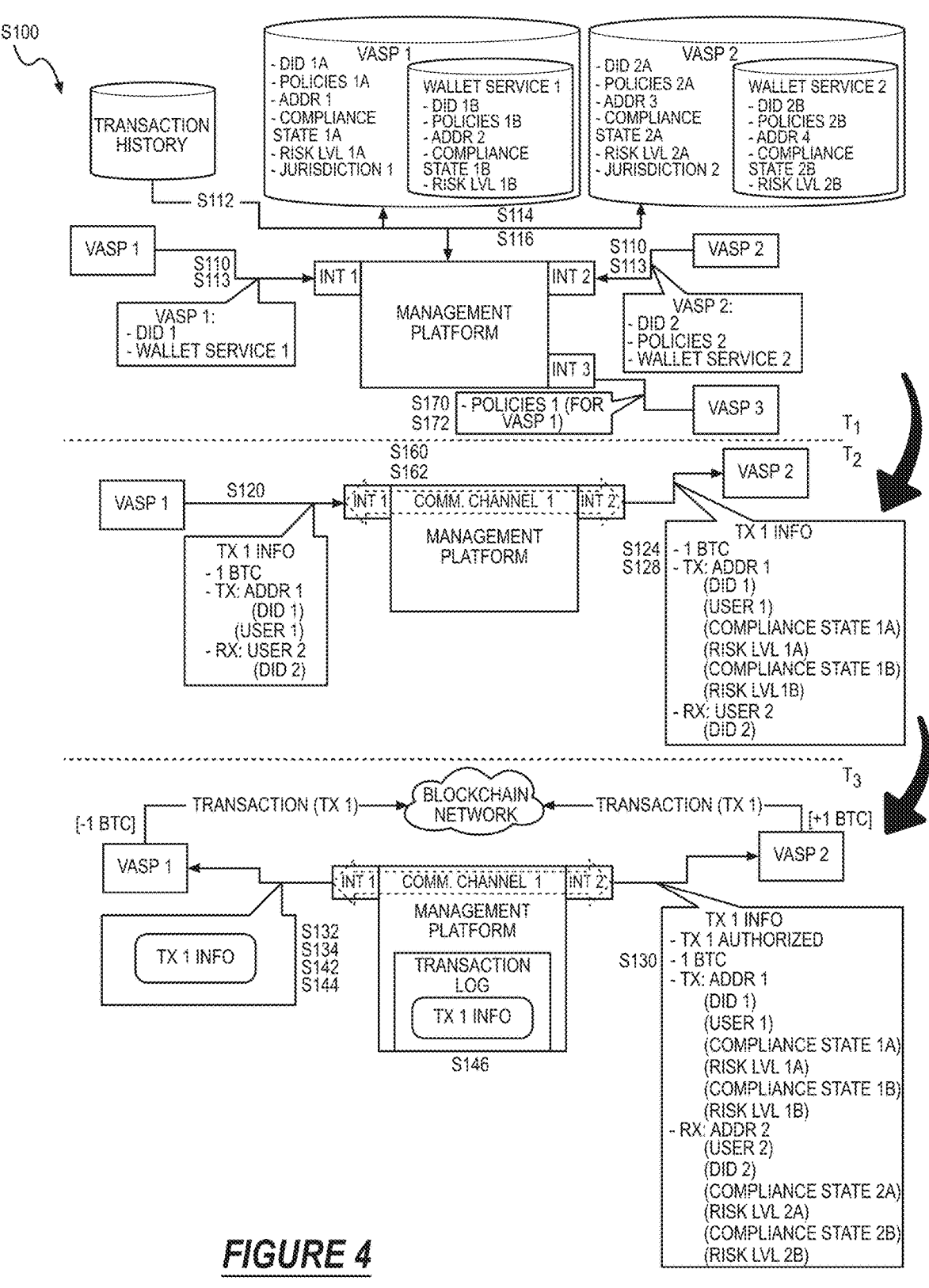
FIG. 4 is a flowchart representation of one variation of the method.

As shown in FIG. 3, one variation of the method S100 includes receiving a first message from a first agent, the first message including a request to transfer a first virtual asset to a first recipient identifier, associated with a second agent, from a sender identifier associated with a sender blockchain address in Block S120. This variation of the method S100 further includes, for the first agent: accessing a first set of policies implemented by the first agent in Block S110; accessing a first set of transaction characteristics of transactions associated with the first agent in Block S112; characterizing a first compliance state of the first agent based on the first set of policies in Block S114; and characterizing a first risk profile of the first agent based on the first set of transaction characteristics, the first risk profile comprising a first risk score in Block S116. This variation of the method S100 further includes: generating a second message including the request, the sender blockchain address, the first compliance state of the first agent, and the first risk profile of the first agent in Block S124; transmitting the second message to the second agent in Block S128; and receiving confirmation from the second agent to proceed with transfer of the first virtual asset based on the first compliance state and the first risk profile in Block S130. This variation of the method S100 further includes, for the second agent: accessing a second set of policies implemented by the second agent in Block S110; accessing a second set of transaction characteristics of transactions associated with the second agent in Block S112; characterizing a second compliance state of the second agent based on the second set of policies in Block S114; and characterizing a second risk profile of the second agent based on the second set of transaction characteristics, the second risk profile comprising a second risk score in Block S116.

This variation of the method S100 further includes: generating a third message including the request, an authorization of transfer of the first virtual asset by the second agent, the second compliance state of the second agent, and the second risk profile of the second agent in Block S132;

transmitting the third message to the first agent in Block S134; and, in response to receiving confirmation from the first agent to proceed with transfer of the first virtual asset based on the second compliance state and the second risk profile, accessing a first recipient blockchain address associated with the first recipient identifier in Block S142 and transmitting the first recipient blockchain address to the first agent to enable transfer of the first virtual asset from the sender blockchain address to the first recipient blockchain address in Block S144.

1.2 Variation: Unidirectional Risk Characterization

Figure 5:
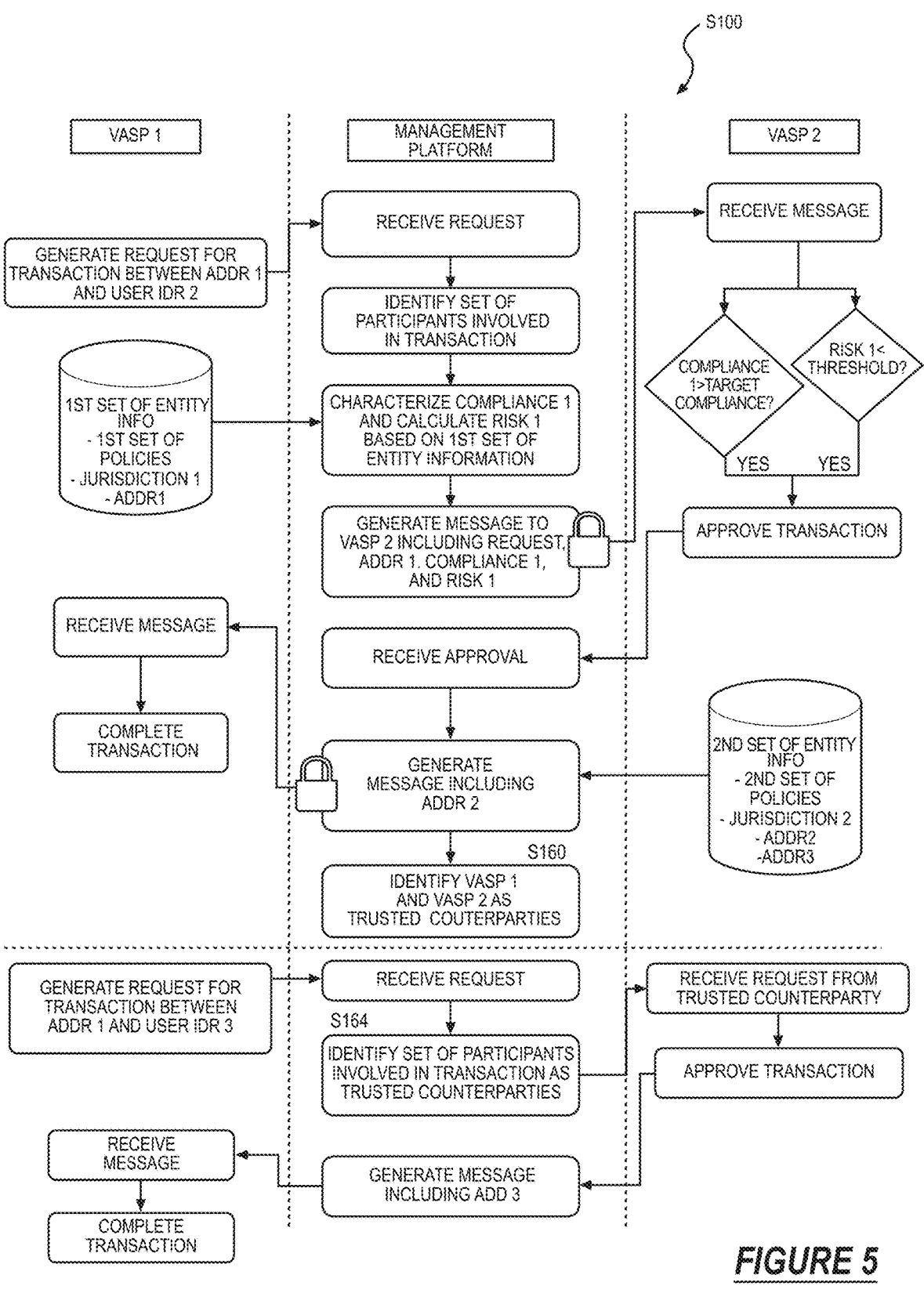
FIG. 5 is a flowchart representation of one variation of the method.
Figure 6:
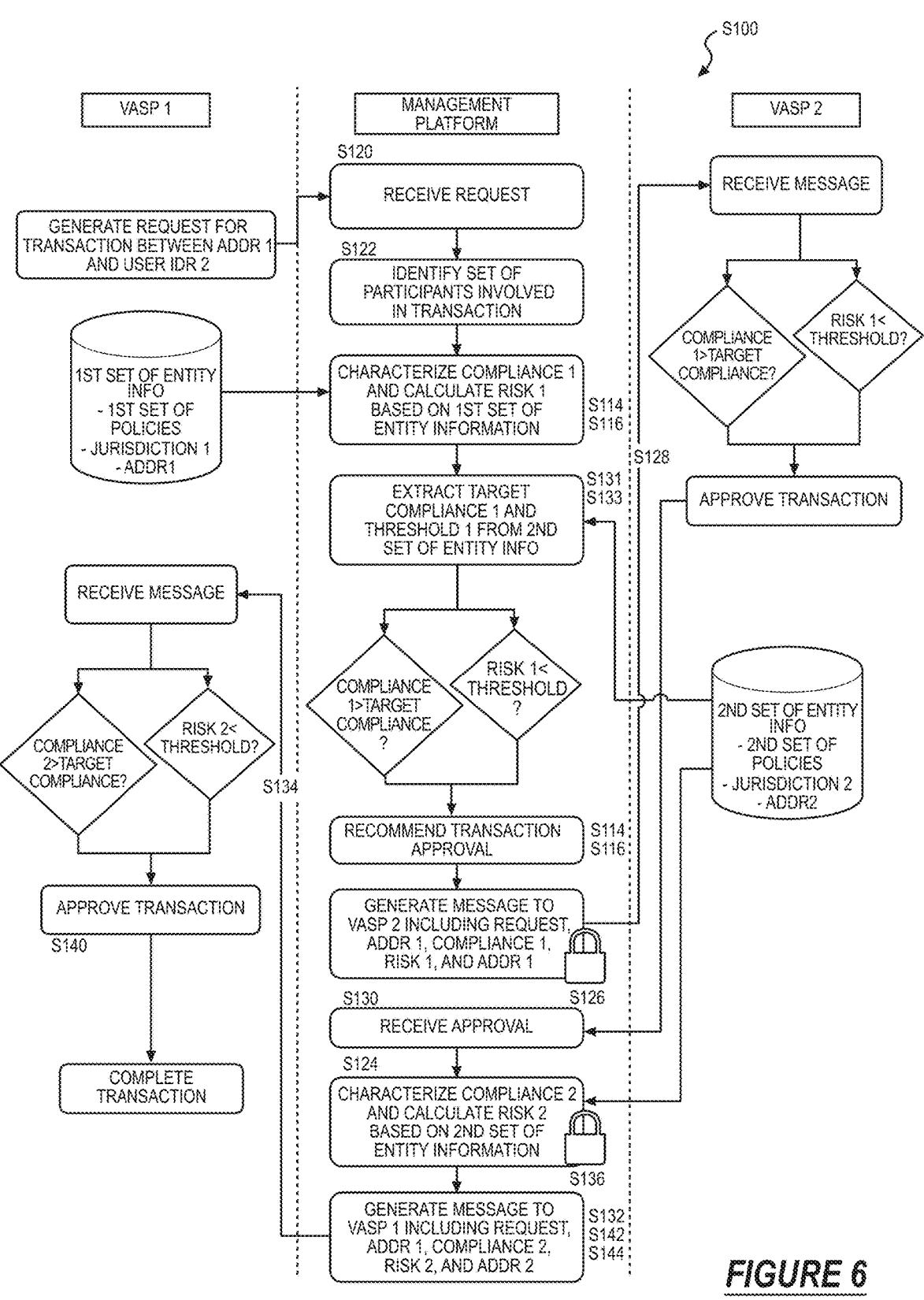
FIG. 6 is a flowchart representation of one variation of the method.

As shown in FIG. 5, another variation of the method S100 includes receiving a first message from a first agent, the first message including a request to transfer a first virtual asset to a first recipient identifier, associated with a second agent, from a sender identifier associated with a sender blockchain address in Block S120.

This variation of the method S100 further includes, for the first agent: accessing a first set of policies implemented by the first agent in Block S110; accessing a first set of transaction characteristics of transactions associated with the first agent in Block S112; characterizing a first compliance state of the first agent based on the first set of policies in Block S114; and characterizing a first risk profile of the first agent based on the first set of transaction characteristics in Block S116.

This variation of the method S100 further includes: generating a second message including the request, the sender blockchain address, the first compliance state of the first agent, and the first risk profile of the first agent in Block S124; transmitting the second message to the second agent in Block S128; and receiving confirmation from the second agent to proceed with transfer of the first virtual asset based on the first compliance state and the first risk profile in Block S130.

This variation of the method S100 further includes: generating a third message including the request, confirmation of transfer of the first virtual asset by the second agent, and a first recipient blockchain address associated with the first recipient identifier in Block S136; transmitting the third message to the first agent in Block S134; receiving a transaction representing the transfer of the virtual asset from the sender blockchain address to the first recipient blockchain address in Block S146; and transmitting a representation of the transaction to a distributed network of nodes for commitment to a block of a blockchain in Block S148.

1.3 Variation: Serial Messaging

Yet another variation of the method S100 includes, during a first time period, for each agent in a set of agents representing a set of users including a sender and a recipient: accessing a set of agent information associated with the agent, the agent information including a jurisdiction of the agent and a set of policies governing the agent in Block S110; accessing a set of transactions associated with the agent during a target time interval in Block S112; characterizing a regulatory compliance state of the agent during the target time interval based on the set of agent information and the set of transactions in Block S114; and characterizing a risk profile including a risk score of the agent during the target time interval based on the set of agent information, the set of transactions, and the regulatory compliance state in Block S116.

The method S100 also includes, during a second time period succeeding the first time period: receiving a first message from a first agent in the set of agents, the first message including a first set of transaction information representing a transfer of a virtual asset from a first blockchain address, associated with the first agent and the sender, to the recipient in Block S120; and identifying a first subset of agents associated with the transfer of the virtual asset based on the first set of transaction information, the first subset of agents including the first agent and a second agent in the set of agents associated with the recipient in Block S122; generating a second message including a second set of transaction information in Block S124; and transmitting the second message to the second agent in Block S128. The second set of transaction information includes: the first set of transaction information; a first regulatory compliance state of the first agent during the target time interval; and a first risk profile including a first risk score of the first agent during the target time interval.

The method S100 further includes, during a third time period succeeding the second time period, receiving a third message from the second agent including a third set of transaction information in Block S130, the third set of transaction information including: an authorization of the transfer of the virtual asset by the second agent based on the second set of transaction information; and a second blockchain address associated with the second agent and the recipient.

The method S100 also includes: generating a fourth message including a fourth set of transaction information in Block S132; and transmitting the fourth message to the first agent in Block S134. The fourth set of transaction information includes: the third set of transaction information; a second regulatory compliance state of the second agent during the target time interval; and a second risk profile including a second risk score of the second agent during the target time interval.

The method S100 further includes, during a fourth time period succeeding the third time period: receiving a transaction representing the transfer of the virtual asset from the first blockchain address to the second blockchain address in Block S146; updating the transaction as a verified transaction including a signature verifying the transfer of the virtual asset from the first blockchain address to the second blockchain address in response to the second regulatory compliance state corresponding to a first target state defined by a first policy associated with the first agent, in response to the second risk score falling below a first threshold risk score defined by a second policy associated with the first agent, in response to the first regulatory compliance state corresponding to a second target state defined by a third policy associated with the second agent, and in response to the first risk score falling below a second threshold risk score defined by a fourth policy associated with the second agent; and transmitting the verified transaction to a distributed network of nodes for commitment to a block of a blockchain in Block S148.

2. APPLICATIONS

Generally, a computer system (hereinafter "the system")—including and/or interfacing with a management platform, a set of agents (e.g., virtual asset exchanges, financial institutions, digital wallet services), and a set of user devices—can execute Blocks of the method S100.

In particular, the computer system can: receive a transaction request from a sender, including a sender handle but excluding a private recipient account identifier (e.g., a blockchain address); aggerate transaction information into a message; automatically identify a set of agents involved in the transaction including an originating agent, a beneficiary agent, and/or a set of subsidiary agents for each of the originating agent and the beneficiary agent; automatically characterize compliance states and risks scores for each agent; selectively pass the request, compliance states, and risks scores to agents for verification of the transaction; and only release the private recipient account identifier to the sender or the originating agent—thereby enabling the sender or the originating agent to complete the transaction—if all agents confirm the transaction.

More specifically, the computer system can execute Blocks of the method S100: to access a first set of agent information (e.g., "Know Your Customer" policies, "Anti-Money-Laundering" policies, "Travel Rule" policies, data security policies, a jurisdiction hosting blockchain addresses) associated with a first agent (e.g., a first virtual asset service provider) in a set of agents; to access a first set of transactions associated with the first agent during a target time interval; to characterize a first compliance state (e.g., regulated, compliant, non-compliant) of the first agent based on the first set of agent information and the first set of transactions; and to characterize a risk profile (e.g., risk scores, risk levels, exposure scores, on-chain trust scores, sanctions trust score) of the first agent based on the first set of agent information and the first set of transactions. The system can repeat these Blocks of the method S100 for each agent in the set of agents: to characterize a compliance state of the agent for a target time interval; and to characterize a risk profile of the agent for the target time interval.

Accordingly, the system can execute Blocks of the method S100 to pre-compute a real-time regulatory compliance state and a real-time risk profile for each agent in the set of agents based on policies governing these agents and transactions associated with these agents.

Therefore, in response to a requested transfer of a virtual asset, the system can execute Blocks of the method S100: to generate and distribute (or pass) messages between agents identifying a subset of agents in the set of agents associated with the requested transfer and excluding identifying information (e.g., blockchain addresses), current (e.g., most recent) regulatory compliance states, and current risk profile of these agents; and to autonomously execute real-time due diligence processes for each agent in the subset of agents based on information within these messages, thereby enabling each agent to independently authorize (or reject) the requested transfer of the virtual asset based on these due diligence processes.

More specifically, for each agent involved in the requested transfer of the virtual asset, the system can execute Blocks of the method S100: to access a set of authorization policies defining authorization (or rejection) conditions (e.g., regulatory compliance states, risk profiles) for different types of participants (e.g., users, agents, financial institutions, exchanges, digital wallet services, blockchain addresses); to access transaction information defining each participant involved in the requested transfer, regulatory compliance states of these participants, and/or risk profiles of these participants; and to automatically authorize (or reject, flag for manual review) the requested transfer based on the transaction information according to the set of authorization policies.

2.1 Example

In one example application, the system executes Blocks of the method S100 to coordinate a requested transfer of a virtual asset from a sender blockchain address, associated with an originating user and hosted by an originating agent (e.g., a first virtual asset service provider), to a recipient blockchain address-associated with a beneficiary user-hosted by a beneficiary agent (e.g., a second virtual asset service provider). In this example application, the requested transfer omits a recipient address (e.g., blockchain address), and the system can execute Blocks of the method S100: to identify a subset of agents (e.g., wallet service providers), in the set of agents, associated with the originating agent and identified as participants in the requested transfer; and to access regulatory compliance states and risk profiles of the originating agent and each agent in the subset of agents. The computer system can then generate a first message including a regulatory compliance state of the originating agent, a first risk profile of the originating agent, and a second risk profile of the originating user; and pass the first message to the beneficiary agent.

In response to each regulatory compliance state of the originating agent and the subset of agents corresponding to a target regulatory compliance state defined in a first policy governing the beneficiary agent, and in response to risk scores in risk profiles of the originating agent and each agent in the subset of agents falling below a threshold risk score defined in a second policy governing the beneficiary agent, the system executes Blocks of the method S100: to generate a second message specifying authorization of the requested transfer and including the recipient blockchain address; and to pass the second message to the originating agent, which may then submit a representation of a transaction—representing the requested transfer of the virtual asset from the second blockchain address to the recipient blockchain address—to a distributed network of nodes for commitment in a block of a blockchain.

Accordingly, the system executes Blocks of the method S100 to expose the destination address (i.e., the second blockchain address) to the originating agent in response to authorization of the requested transfer by the beneficiary agent. In particular, the computer system can: identify each participant associated with a particular transaction; and selectively pass compliance characterizations and risk profiles (based on transaction history) associated with these participants to beneficiaries in order to establish trust between such participants.

2.2 Responsive Compliance Characterization

In one variation, the computer system can, in response to receiving a request, from an originating virtual asset service provider (hereinafter VASP), to transfer a virtual asset from a sender blockchain address to an unknown recipient blockchain address associated with an identified beneficiary VASP: characterize a compliance state and a risk profile of the originating VASP and the beneficiary VASP (and/or agent affiliated with these VASPs); and selectively pass representations of the compliance states and risk profiles between the originating and beneficiary VASPs.

In particular, the computer system can, in response to receiving the request: access a set of transaction characteristics, of transactions associated with historical activity by the originating VASP and/or the sender and occurring during a target time period (e.g., within the last week, within the last month), and characterize a risk profile for the originating VASP and/or the sender based on the set of (recent) transaction characteristics. The computer system can additionally access a set of policies, implemented by and governing the originating VASP, and characterize a compliance state of the originating VASP based on these policies, such as based on presence of target policies (e.g., "Know Your Customer" policies, "Anti-Money-Laundering" policies, "Travel Rule" policies, data security policies, jurisdiction and/or sanctioned jurisdiction policies) identified in a second set of policies implemented by and governing the beneficiary VASP.

Accordingly, the computer system can execute Blocks of the method S100 to release a private recipient account identifier (e.g., blockchain address) to an originating agent—thereby enabling the originating agent to complete the transaction—if all agents involved in the transaction confirm the transaction based on compliance states and risk profiles of counterparty agents.

Additionally, the computer system can execute the method S100 in order to prevent fraudulent transactions—that must be disseminated across every device connected to a blockchain network—to thereby reduce computational costs and energy consumption across the blockchain network by reducing ledger updates and increasing security and efficiency of the blockchain network.

Therefore, the computer system can: pass information related to regulatory compliance requirements to counterparty agents (e.g., VASPs, wallet services); and control (e.g., authorize, reject) flow of virtual assets into addresses hosted by the beneficiary agent, thereby enabling the beneficiary agent to mitigate risk of (unintentional) involvement in fraudulent and/or criminal activity by the beneficiary agent.

3. TERMINOLOGY

Generally, a "party" is referred to herein as an entity (e.g., a user, a natural person, a legal entity) associated with a transaction.

Generally, an "agent" is referred to herein as an intermediary associated with a transaction. An agent may represent a party (or another agent) in a transaction.

Generally, a "participant" is referred to herein as a party or an agent associated with a transaction.

Generally, a "virtual asset" is referred to herein as a digital representation of value, excluding digital representations of fiat currencies, such as: a cryptocurrency asset; a token; etc.

Generally, a "virtual asset service provider" is referred to herein as an agent that, on behalf of a party: exchanges between virtual assets and fiat currencies; exchanges between virtual assets; transfers virtual assets; and/or stores (and/or administrates) virtual assets or instruments that control virtual assets; etc.

Generally, a "signature" is referred to herein as a mathematical scheme for verifying authenticity of digital messages and/or data (e.g., acceptance of a transaction, verification of elements associated with a transaction).

4. SYSTEM

Generally, the system can include and/or interface with: a set of user devices; a set of agents; and a management platform. The set of user devices, the set of agents, and the management platform can be communicatively coupled via a communication network (e.g., the Internet, a wide area network, a local area network).

In one implementation, a sender device—associated with a sender—generates a first request to execute a first transaction associated with a first blockchain address associated with the sender and a second blockchain address associated with a recipient. In this implementation, the sender device generates the first request to execute the first transaction defining a set of parties associated with the transaction. The set of parties include: the sender as a first party; and the recipient as a second party.

4.1 User Device

In one implementation, the system can include a set of user devices (e.g., computing devices, smartphones, tablets, laptop computers, desktop computers) associated with a set of users (e.g., natural persons, legal entities). Each user may be associated with a blockchain address (e.g., a custodial wallet, a non-custodial wallet) representing a virtual location at which a virtual asset (or an amount of a virtual asset) may be stored, to which a virtual asset may be deposited, and/or from which a virtual asset may be withdrawn.

4.2 Agents

Generally, the system can include a set of agents (e.g., computing devices), such as virtual asset service providers (hereinafter "VASPs") (e.g., cryptocurrency exchanges, financial institutions), custodial wallet services, self-hosted wallets (e.g., user devices), blockchain bridges, decentralized finance protocols, blockchain addresses, smart contracts, and other services associated with a transaction, etc.

In one implementation, an agent can represent a party (e.g., a user) or another agent as an intermediary in a transaction.

In one example, an agent includes a VASP that represents (or "hosts") a blockchain address (e.g., a custodial wallet) for a user. The VASP receives a request—from a user device associated with the user—to execute transactions associated with the blockchain address associated with this user.

In another example, an agent (e.g., a VASP) is affiliated with subsidiary agents, such as custodial wallet service providers, payment processors, token issuance entities, etc. The system can identify these subsidiary agents as participants in a particular transaction based on affiliation between the VASP, the subsidiary agent, and a sender identifier (and/or a sender blockchain address).

In another example, an agent includes a user device associated with a user. In this implementation, the user device represents (or "self-hosts") a blockchain address (e.g., a non-custodial wallet) for the user.

4.3 Blockchain Structure

Generally, the system can include a distributed network of nodes (e.g., computer devices) interconnected through a communication medium (e.g., the Internet, a wide area network, a local area network).

In one implementation, the distributed network of nodes (or a subset of nodes in the distributed network of nodes): receives a transaction—from an agent—representing a transfer of an amount of a virtual asset from a first blockchain address to a second blockchain address; validates the transaction; generates a block representing (or including) the transaction; and appends the block to a blockchain.

For example, the computer system can record a transaction, representing transfer of the virtual asset from a sender blockchain address to a recipient blockchain address, by: generating a transaction hash based on a cryptographic hash function; generating the transaction representing completion of the transfer of the virtual asset from the second blockchain address to the recipient blockchain address and the transaction hash; and transmitting a representation of the transaction to a distributed network of nodes for commitment to a block of a blockchain.

4.4 Management Platform

Generally, the management platform (e.g., a computer device) can: establish communication links with agents in the set of agents; expose each of these agents to other agents in the set of agents; generate communication channels between agents in the set of agents; and/or manage communication across these communication channels.

In one implementation, the management platform generates a communication channel—between the first agent and the second agent—through which a set of transaction information, associated with a transfer of a virtual asset, may be exchanged.

5. AGENT COMPLIANCE STATE

Generally, the system can: access agent information (e.g., policies, transaction history) associated with the set of agents; and characterize compliance states of the set of agents based on the agent information.

In one implementation, for each agent in the set of agents, the system executes methods and techniques described in U.S. patent application Ser. No. 18/949,310: to receive agent information associated with the agent; to verify the agent information associated with the agent; and to assign a risk profile (or risk level) to the agent based on the agent information.

In one example, the management platform can receive the agent information including: an identifier (e.g., a name, an identification number) associated with the agent; a jurisdiction (e.g., a country) governing the agent; a set of policies associated with the agent (e.g., security policies, data storage policies, regulatory requirements under which the agent operates, transaction recordkeeping policies); etc.

In particular, the computer system can: access a jurisdiction (e.g., a hosting jurisdiction, a governing jurisdiction) associated with the agent in Block S113 of the method S100; and characterize a risk profile for the agent based on the jurisdiction associated with the agent and a set of transaction characteristics (e.g., jurisdiction of transactions, risk of participants interacting with the agent and/or the sender, frequency of transactions with a particular jurisdiction) in Block S116

For example, a risk profile can include: a risk score; a sanctions exposure score; a restricted entities exposure score; an Anti-Money Laundering (AML) score; a Know Your Transaction (KYT) score; an on-chain trust score; a wallet risk index; and/or a transactions risk rating.

In this example, the management platform can: verify the agent information (e.g., based on corroborating information retrieved from an external data repository); and assign a risk level (or a risk score) (e.g., a "high" risk level corresponding to a high-risk agent, a "low" risk level corresponding to a low-risk agent, a "medium" risk level corresponding to a low-risk entity in a high-risk jurisdiction) to the agent based on the agent information. Additionally or alternatively, the computer system can: calculate a first risk score for a first agent; and calculate a second risk score for a second agent, the second risk score exceeding the first risk score. The computer system can then characterize the first agent as a "low" risk agent, and the second agent as a "high" risk agent.

In another example, the management platform: accesses a policy, governing a beneficiary agent, defining a threshold proportion (e.g., 5%, 15%) of transactions to (and/or from)

a target jurisdiction (e.g., country) within a time interval; accesses a target set of transactions associated with the originating agent during a target time interval; extracts a set of transaction characteristics from the set of transactions, such as a set of blockchain addresses (e.g., source addresses, destination addresses) associated with the set of transactions; calculates a proportion of transactions, in the set of transactions, associated with the target jurisdiction based on the set of blockchain addresses; and assigns a risk score to the originating agent based on the proportion of transactions. More specifically, the management platform can assign a "low" risk score (e.g., "3") to the originating agent in response to the proportion of transactions falling below the threshold proportion of transactions. Alternatively, the management platform can assign a "high" risk profile (e.g., 8, 9.2) to the originating agent in response to the proportion of transactions exceeding the threshold proportion of transactions.

Therefore, the system can characterize a real-time regulatory compliance state (e.g., regulated, compliant, noncompliant) and a risk profile of each agent, in the set of agents, during a target time interval based on agent information associated with the agent—such as a jurisdiction and/or a set of policies governing the agent—and completed transactions associated with the agent during the target time interval.

The system can repeat the foregoing methods and techniques for each agent in the set of agents and for each time interval in a set of time intervals: to access a set of agent information (e.g., policies) associated with the agent during the time interval; to access a set of transactions associated with the agent during the time interval; and to characterize a regulatory compliance state and/or a risk profile of the agent during the time interval based on the set of agent information and the set of transactions.

Additionally or alternatively, the computer system can repeat the foregoing methods and techniques for each agent identified as a participant in a particular transaction prior to execution (and/or approval) of the transaction. In particular, the computer system can identify a set of participants involved in a transaction, the set of participants including: an originating agent; a first subset of agents affiliated with the originating agent; a beneficiary agent; and a second subset of agents affiliated with the beneficiary agent. The computer system can then: characterize a compliance state for each participant based on current policies (e.g., new policies, updated policies) and target compliance standards from the corresponding agent (e.g., the originating agent, the beneficiary agent); and characterize a risk profile for each participant based on transactions affiliated with (e.g., involving) that participant during a target time interval.

Therefore, in this example the computer system can calculate real-time compliance states and risk profiles responsive to receiving a new request for a transaction from an unknown (e.g., new, unencountered) agent (e.g., a VASP).

5.1 Policies & Transaction Characteristics of Subsidiary Agents

In one implementation, the computer system can execute Blocks of the method to: access a set of policies implemented by (e.g., associated with, governing) an agent in Block S110; extract target compliance states of counterparty agents from the set of policies in Block S131; extract threshold risk scores of counterparty agents from the set of policies in Block S133; and generate (e.g., calculate, characterize) and/or identify a compliance state of the agent based on these policies.

In particular, in response to identifying a set of subsidiary agents affiliated with (e.g., governed by, administrated by, contracted with) a primary agent (e.g., the originating VASP, the beneficiary VASP), the computer system can access a first set of policies implemented by the first agent, the first set of policies including a second set of policies implemented by a first subset of agents (e.g., a set of identified subsidiary agents, a set of wallet service providers). In this implementation, the computer system can characterize the first compliance state of the first agent based on the first set of policies and the second set of policies.

Similarly, the computer system can access a first set of transaction characteristics of transactions associated with (e.g., involving) the first agent, the first set of transaction characteristics including a second set of transaction characteristics of transactions associated with the first subset of agents. In this implementation, the computer system can characterize a risk profile for the first agent based on the first set of transaction characteristics and the second set of transaction characteristics.

The method S100 is described herein as the computer system accessing the set of policies for the agent and the set of subsidiary agents. Additionally or alternatively, the first agent (e.g., the first VASP) can access the set of policies governing the set of subsidiary agents and pass the set of policies to the computer system with a request for a transfer of a virtual asset to a recipient identifier associated with a second agent absent from the set of subsidiary agents.

In another implementation the agent can: access the set of policies implemented by the subsidiary agents; and pass the set of policies to the remote computer system. The computer system can then: receive a set of policies, including policies implemented by the governing agent and the subsidiary agents, and implement methods and techniques as described herein to characterize a compliance state for the governing agent and each agent in the set of subsidiary agents.

5.2 Blockchain Address Registration & Risk

In another implementation, the system can execute methods and techniques described in U.S. patent application Ser. No. 18/949,310: to receive the agent information including a set of blockchain addresses hosted by an agent; to characterize a risk profile (or a risk score) (e.g., a "high" risk score corresponding to a high-risk blockchain address, a "low" risk score corresponding to a low-risk blockchain address) to each blockchain address in the set of blockchain addresses, such as based on a transaction history associated with the blockchain address, an agent hosting the blockchain address, and/or an identifier of a user associated with the blockchain address.

Additionally, the system can execute methods and techniques described in U.S. patent application Ser. No. 18/949, 310: to receive an identifier (e.g., a full name, an identification number) of a user associated with a blockchain address in the set of blockchain addresses; to encrypt the identifier as an encrypted identifier; to store the encrypted identifier in the data repository; and to assign a risk level (or a risk profile) to a user (or user identity), such as based on a transaction history associated with the user (or user identity), a jurisdiction of the user, etc.

In one implementation, the computer system can: establish communication links with a set of agents (e.g., virtual asset service providers); receive entity information (e.g., "Know Your Customer" policies, "Anti-Money-Laundering" policies, "Travel Rule" policies, data security policies, hosted blockchain addresses) for each agent in the set of agents; identify a first agent (e.g., a first virtual asset service provider) and a second agent (e.g., a second virtual asset service provider), in the set of agents, that are candidate counterparties in future transactions; and generate a secure communication channel between the first agent and the second agent.

In one example, a risk profile associated with a particular VASP can include: a first risk score associated with the particular VASP; a second risk score associated with a first subsidiary agent affiliated with the particular VASP; and a third risk score associated with a second subsidiary agent affiliated with the particular VASP. The computer system can therefore approve a message based on each risk score in the risk profile falling below a risk score threshold or reject a message in response to a risk score in the risk score profile exceeding the risk score threshold.

Accordingly, the computer system can characterize risk of each of two agents identified as candidate counterparties. Therefore, the management platform can: enable each of the two agents to access a risk profile associated with the candidate counterparty; and, based on the risk, identify the candidate counterparty as "trusted" or "not trusted".

In one variation, the computer system can implement methods and techniques described herein to characterize risk profiles for agents in response to a compliance state for the agent fulfilling a compliance requirement. For example, the computer system can withhold characterization of a risk profile for an agent in response to a compliance state for the agent failing to fulfil a compliance requirement.

Additionally or alternatively, the computer system can implement methods and techniques described herein to characterize compliance states for agents in response to a risk score for the agent exceeding a threshold risk score. For example, the computer system can withhold characterization of a compliance state for an agent in response to a risk score for the agent exceeding the threshold risk score.

In another variation, the computer system can implement methods and techniques described herein to characterize a risk profile for an agent according to a risk profile characterization schedule. For example, the computer system can, for a first agent in the set of agents: detect a time difference between a current time and a time of characterization of a first risk profile for the first agent; and, in response to the time difference exceeding a threshold time difference, access a second set of transaction characteristics and characterize a second risk profile for the first agent based on the second set of transaction characteristics. In another example, the computer system can: detect a transaction count for the first agent during a target time interval; and, in response to the transaction count exceeding a threshold transaction count during the target time interval, access a second set of transaction characteristics associated with transactions during the target time interval and characterize a second risk profile for the first agent based on the second set of transaction characteristics.

The computer system can repeat the foregoing methods and techniques for each agent in the set of agents to continuously update risk profiles for agents in the set of agents based on new (e.g., most recent) transactions.

Additionally or alternatively, the computer system can repeat the foregoing methods and techniques for each agent in the set of agents to continuously update compliance states for agents in the set of agents based on new (e.g., most recent) policies. In particular, for a first agent in the set of agents, the computer system can: detect a time difference between a current time and a time of characterization of a first compliance state for the first agent; and, in response to the time difference exceeding a threshold time difference, access a second set of policies for the first agent and characterize a second compliance state for the first agent based on the second set of policies.

5.3 Compliance State Requirements and Thresholds

In one implementation, the computer system can extract target compliance states and threshold risk scores for target counterparty agents from a set of policies (e.g., a policy in the set of policies) implemented by and governing a particular agent.

In particular, the computer system can: extract a compliance state requirement from a first policy in the set of policies; and extract a risk score threshold from a second policy (and/or the first policy) in the set of policies In one example, the computer system can: extract the first compliance state requirement and the first risk profile requirement from a first set of policies associated with the first agent; extract the second compliance state requirement and the second risk profile requirement from a second set of policies associated with the second agent; in response to each compliance state in the second set of compliance states fulfilling a first compliance state requirement and each risk score, in the second set of risk profiles fulfilling a first risk profile requirement, recommending approval of the request to the first agent; and, in response to each compliance state in the first set of compliance states fulfilling a second compliance state requirement and each risk score in the first set of risk profiles fulfilling a second risk profile requirement, recommending approval of the request to the second agent.

In one variation, the computer system can calculate (and/or characterize) a threshold risk score for an agent based on risk requirements identified in the set of policies. In particular, the computer system can identify risk parameters in a particular policy in the set of policies and assign a threshold risk score to the agent based on these risk parameters.

Therefore, the computer system can: identify and/or extract a target compliance state and a threshold risk score for a target counterparty agent from a set of policies governing the beneficiary agent; and characterize a risk profile and/or characterize a compliance state for an originating agent based on the target compliance state and the threshold risk score.

5.4 Responsive Risk Profile Characterization

Additionally or alternatively, the computer system can repeat the foregoing methods and techniques for each agent identified as a participant in a particular transaction in response to receiving a transaction request. In particular, the computer system can: identify a set of participants involved in a particular transaction; characterize a compliance state based on policies (e.g., new policies, updated policies) based on target compliance standards from beneficiary agent; and characterize risk profiles based on transactions during a target time interval.

In particular, in response to receiving a message from a first agent, the first message including a request to transfer a virtual asset to a recipient identifier, associated with a second agent, the computer system can, for the first agent: access a first set of policies implemented by the first agent; access a first set of transaction characteristics of transactions associated with the first agent; characterize a first compliance state of the first agent based on the first set of policies; and characterize a first risk profile of the first agent based on the first set of transaction characteristics.

In one example, an originating VASP transmits a message to the computer system, the message including a request to transfer a virtual asset from a sender blockchain address hosted by the originating VASP to a recipient identifier hosted by a beneficiary VASP. In response to receiving the message and in response to detecting absence of history of transactions between the originating VASP and the beneficiary VASP, the computer system can implement methods and techniques as described herein to characterize a compliance state and characterize a risk profile for the originating VASP, and transmit the compliance state and the risk profile to the beneficiary VASP to enable the beneficiary VASP to approve (or reject) the transaction request.

In another example, the computer system can, in response to receiving the message from the originating VASP: identify a subset of agents affiliated with the originating VASP; characterize a compliance state and characterize a risk profile for each agent in the subset of agents; and transmit each compliance state and risk profile to the beneficiary VASP to enable the beneficiary VASP to approve (and/or reject) the transaction request.

Therefore, the computer system can characterize real-time compliance states and risk profiles responsive to receiving a new request for a transaction from an unknown (e.g., new, unencountered) agent (e.g., a VASP) to conserve computational resources for each transaction.

6. VIRTUAL ASSET TRANSFER

Generally, the system can coordinate a transfer of a virtual asset (or an amount of the virtual asset) between a first party (e.g., a sender, a sender identifier) and a second party (e.g., a recipient, a recipient, a recipient identifier).

The transfer of the virtual asset can be associated with a set of participants including: a set of parties (e.g., the sender, the recipient); and a set of agents representing the set of parties. For example, the set of agents can include: a first blockchain address associated with the sender; a first VASP associated with the first blockchain address; a first digital wallet service hosting the first blockchain address on behalf of the first VASP; a second blockchain address associated with the recipient; a second VASP associated with the second blockchain address; and a second digital wallet service hosting the second blockchain address on behalf of the second VASP.

More specifically, the system can: identify the set of participants—including the set of agents-involved in executing the requested transaction; and manage communication of transaction information (e.g., an amount and type of virtual asset, a regulatory compliance state and/or a risk profile of each participant in the set of participants, relevant policies based on target counterparty policies defined by a beneficiary agent), associated with the transfer of the virtual asset, between the set of agents. Based on the transaction information, the system (e.g., an agent) can authorize (or reject) the transfer of the virtual asset according to a set of policies associated with the agent.

In response to each agent in the set of agents authorizing the transfer, the system can: access the second blockchain address associated with the recipient; release the second blockchain address to the first VASP; generate a transaction representing the transfer of the virtual asset between the first blockchain address and the second blockchain address; and submit the transaction to a distributed network of nodes for inclusion in a block of a blockchain.

6.1 Virtual Asset Transfer Request

In one implementation, the first VASP receives a request—such as from a sender identifier associated with the sender—to transfer a virtual asset (or an amount of the virtual asset) between the sender blockchain address and a recipient (unknown) blockchain address associated with a (known) recipient identifier associated with the recipient.

In one example, the first VASP receives a request to transfer the virtual asset from the first blockchain address to the recipient, the request specifying a recipient identifier and omitting a blockchain address affiliated with the recipient identifier. In this example, the system receives the request from the first VASP, the request including the virtual asset, the first blockchain address, and the sender identifier. The system can then append the request with: a first (e.g., most recent) compliance state associated with the first VASP (and/or the sender identifier); and a first (e.g., most recent) risk profile associated with the first VASP (and/or the sender identifier).

In another example, the first VASP receives a request to transfer the virtual asset from the recipient blockchain address to the sender blockchain address.

In another implementation, the first VASP receives the request including transaction information, such as: a virtual asset type; an amount (or value) of the virtual asset to transfer; a first identifier (e.g., a first full name) of the sender; the sender blockchain address; a second identifier (e.g., a first decentralized identifier) of the first VASP; a third identifier (e.g., a second full name) of the recipient; and/or a fourth identifier (e.g., a second decentralized identifier) of the second VASP associated with the recipient; etc.

6.2 Participant Discovery & Data Sharing

Generally, the system can identify participants associated with the transfer of the virtual asset based on the request to transfer the virtual asset. For example, based on the request, the system can identify the set of participants including: the sender; the first VASP; and the recipient. However, the transfer of the virtual asset may be associated with additional agents representing the sender and the recipient and excluded from (e.g., not identified in) the request. In particular, the transfer of the virtual asset may be associated with additional agents unknown to the sender, the recipient, and/or the beneficiary VASP.

In one example, a beneficiary VASP may require a particular policy for any originating agent with which the beneficiary VASP transacts. In this example, the originating VASP may be unable to access and/or share the particular policy (e.g., a policy affiliated with a subsidiary agent of the originating VASP) that the beneficiary VASP is requesting. The computer system can therefore: access the particular policy from the subsidiary agent; characterize a compliance state of the subsidiary agent based on target policies required by the beneficiary VASP; and pass the compliance state to the beneficiary VASP to enable the beneficiary VASP to verify the compliance state of the subsidiary agent.

In one implementation, the computer system can identify a set of participants involved with a transaction request, the set of participants including: a first agent (e.g., the originating VASP) affiliated with the sender identifier and/or hosting the sender blockchain address; a second agent (e.g., the beneficiary VASP) affiliated with the recipient identifier and/or hosting the recipient blockchain address; a first subset of agents affiliated with the first agent; and a second subset of agents affiliated with the second agent.

In another implementation, the computer system can retrieve a set of policies governing a set of subsidiary agents affiliated with a VASP, the set of policies omitting identifiers for each subsidiary agent. The computer system can retrieve the set of policies from the VASP, an external data repository, and/or from each subsidiary agent in the set of subsidiary agents. In this implementation, the computer system can characterize a compliance state for the subsidiary agents and transmit the compliance state to a beneficiary VASP while omitting identifiers of these subsidiary agents.

Accordingly, the system can coordinate communication between agents to identify a complete set of participants associated with the transfer. Therefore, in response to identifying this complete set of participants, agents can authorize (or reject) the transfer based on regulatory compliance states and/or risk profiles of these participants according to transaction authorization policies governing these agents.

6.2.1 First Message

Generally, the computer system can receive a first message from a first agent (e.g., the first VASP), the first message including a request to transfer a first virtual asset to a first recipient identifier from a sender identifier associated with a sender blockchain address.

In particular, the first agent can receive a request from a user—the request specifying a transfer type, a transfer amount, and/or a recipient (e.g., recipient username, recipient identifier)—and append the request with additional agent information, such as a sender identifier (e.g., sender blockchain address), a virtual asset specification, and/or agent policies/transaction history.

In one implementation, the system receives the request including a first set of transaction information identifying: the first VASP, the virtual asset type; the amount of the virtual asset to transfer; the first identifier of the sender; the sender blockchain address; the second identifier of the first VASP; the third identifier of the recipient; and/or the fourth identifier of the second VASP associated with the recipient. Based on the first set of transaction information, the system (and/or the first VASP) identifies a first subset of agents associated with the transaction including: the first blockchain address; the first VASP; a first subsidiary agent affiliated with the first VASP; the second VASP; and a second subsidiary agent affiliated with the second VASP.

In particular, in the foregoing implementation, the first message includes the sender blockchain address, and omits the first recipient blockchain address. For example, the computer system (and/or the second agent) can receive the first message from the first agent, the first message omitting the recipient blockchain address and including a request for the recipient blockchain address to enable transfer of the virtual asset from the sender blockchain address to the recipient blockchain address.

Additionally, the system (and/or the first VASP) can identify the first subset of agents including the first digital wallet service hosting the first blockchain address on behalf of the first VASP and/or other agents (e.g., agents representing the sender, agents representing the first VASP).

In another implementation, the first VASP generates a second set of transaction information including: the first set of transaction information; and an identifier of the first digital wallet service. The first VASP: generates a first message including the second set of transaction information; and transmits the first message to the first digital wallet service, the second VASP, and/or the management platform.

6.2.2 Second Message

Generally, the computer system can generate a second message, such as in response to receiving a first message, the second message including: the request from the first message appended with a compliance state of the first agent; and a risk profile associated with the first agent.

In particular, the computer system can generate the second message including: the request; the sender blockchain address; a first compliance state of the first agent; and a first risk profile of the first agent. The computer system can then transmit the second message to the second agent (e.g., beneficiary VASP).

In one implementation, in response to receiving the first message, the management platform identifies the first subset of agents including: the first blockchain address; the first VASP; the first digital wallet service; and the second VASP. For each agent in the first subset of agents, the management platform can: access a (current) regulatory compliance state of the agent; and/or a (current) risk level (or risk profile) assigned to the agent. The management platform can generate a third set of transaction information including these regulatory compliance states and/or risk profiles.

For example, the management platform can generate the third set of transaction information including: the second set of transaction information; a first regulatory compliance state of the first VASP; a second regulatory compliance state of the first digital wallet service; a third regulatory compliance state of the second VASP; a first risk profile of the first blockchain address; a second risk profile of the first VASP; a third risk profile of the first digital wallet service; and a fourth risk profile of the second VASP. The management platform can generate the third set of transaction information including additional information associated with agents in the first subset of agents, the sender (e.g., a fifth risk profile of the sender), and/or the recipient (e.g., a sixth risk profile of the recipient).

In this implementation, the management platform can: generate a second message including the third set of transaction information; and transmit the second message to the first VASP, the first digital wallet service, and/or the second VASP.

Additionally, in this implementation, the computer system can generate the second message including a set of compliance states for each counterparty identified in the transaction. In one example, the computer system can generate the second message including: a first set of compliance states of each agent in the first subset of agents (e.g., wallet service providers, subsidiary agents); and a first set of risk profiles including a first set of risk scores of each agent in the first subset of agents. The computer system can then pass the second message to the second agent (e.g., the beneficiary VASP) to enable the beneficiary VASP to authorize (or reject) the transaction request based on these compliance states and risk profiles.

Therefore, in this example, the computer system can include each compliance state and risk profile for counterparties identified in a particular transaction to enable a beneficiary agent (e.g., VASP) to evaluate these compliance states and risk profiles for each agent in the subset of agents against a target compliance state and target risk profile defined by the set of policies governing the beneficiary agent.

In another implementation, the computer system can characterize the first compliance score and characterize the first risk profile in response to receiving the first message.

Therefore, by transmitting the second message—including transaction information specifying current regulatory compliance states and/or risk profiles of agents associated with the transfer—to these agents, the management platform enables each agent: to execute real-time due diligence processes based on the transaction information; and to accept (or decline) the transfer of the virtual asset based on these due diligence processes while minimizing latency of transfer (or transaction) authorization. In response to the beneficiary VASP accepting a transfer, the computer system can then release the recipient blockchain address to the originating VASP (and/or a wallet service affiliated with the originating VASP) to enable transfer of the virtual asset from the second blockchain address to the recipient blockchain address.

6.2.3 Additional Messages

Generally, in response to receiving the first message and/or the second message, the system can repeat the foregoing methods and techniques: to identify an additional agent(s) associated with the transfer; to generate an updated set of transaction information identifying the additional agent(s) in the first subset of agents, a regulatory compliance state, and/or a risk profile of the additional agent; to generate a new message including the updated set of transaction information; and to transmit the new message to agents in the first subset of agents and/or the management platform.

For example, the second VASP can: identify the first subset of agents including the second digital wallet service hosting the second blockchain address on behalf of the second VASP; generate a fourth set of transaction information including the third set of transaction information and a sixth identifier of the second digital wallet service; generate a third message including the fourth set of transaction information; and transmit the fourth message to the management platform and each agent in the first subset of agents.

In this example, in response to receiving the third message, the management platform can generate a fifth set of transaction information including: the fourth set of transaction information; a fourth regulatory compliance state of the second digital wallet service; and a seventh risk profile of the second digital wallet service. Then, the management platform can: generate a fourth message including the fifth set of transaction information; and transmit the fourth message to agents in the first subset of agents.

In one implementation, the computer system can: generate a third message requesting transaction information and/or policies related to a particular agent (e.g., excluded from the set of agents) involved in a transaction in Block S170; and broadcast the message to each agent in the set of agents. In particular, the computer system can: identify absence of a set of policies affiliated with an originating VASP; generate a message including a request for the set of policies; transmit the message to a set of agents; and receive a second message, from an agent in the set of agents, the second message including the set of policies. The computer system can then: access the set of policies from the second message in Block S172; and characterize a compliance state of the originating VASP based on the set of policies.

In a similar implementation, the computer system can: identify absence of a set of transaction characteristics affiliated with an originating VASP; generate a message including a request for the set of transaction characteristics; transmit the message to a set of agents; and receive a second message, from an agent in the set of agents, the second message including the set of transaction characteristics. The computer system can then: access the set of transaction characteristics from the second message; and characterize a risk profile for the originating VASP based on the set of transaction characteristics.

Therefore, by broadcasting a message to the set of agents, the computer system can request a particular (e.g., omitted, absent) policy or transaction history for a particular agent from another agent in the set of agents to enable the computer system to characterize a compliance state or characterize a risk profile for the particular agent, such as in response to receiving a transaction request from this particular agent.

6.3 Messaging Protocols

In one variation, the system can: transmit a set of messages between agents involved in a transaction, each message in the set of messages encrypted according to a target encryption protocol in Blocks S126 and S136. In particular, the computer system can: generate a message including a request to transfer a virtual asset from a sender blockchain address to a recipient identifier, a compliance state of a first agent affiliated with (e.g., hosting) the sender blockchain address, and a risk profile for the first agent; encrypt the first message according to a target encryption protocol (e.g., hash-based encryption, asymmetric encryption, end-to-end encryption, zero-knowledge proofs); and transmit the message to a beneficiary agent.

Therefore, by encrypting messages sent between agents governing a transaction, the computer system can ensure these messages comply with governing encryption standards, such as implemented by a governing agent, the originating VASP, and/or the beneficiary VASP.

6.4 Transfer Authorization

Generally, an agent can: access a message including a set of transaction information; access a set of policies (e.g., transfer authorization policies) associated with the agent; and authorize (or reject) the transfer of the virtual asset based on the set of policies associated with the agent and the set of transaction information.

6.4.1 Transfer Authorization Policies

In one implementation, the system accesses a set of policies associated with an agent.

In one example, the system accesses a first policy defining a target regulatory compliance state (e.g., regulated, compliant) for another agent (or type of agent) associated with a transfer.

In another example, the system accesses a second policy defining a target risk score threshold (e.g., 20%, 50%) of an agent (or type of agent) associated with the transfer.

In another example, the system accesses a third policy defining a target risk score threshold (e.g., 20%, 50%) of a party (e.g., the sender, the recipient) associated with the transfer.

6.4.2 Authorization

Generally, each agent in the first subset of agents can validate (e.g., authorize, reject) the transaction based on the set of transaction information and the set of policies associated with the agent.

In one implementation, the computer system can receive confirmation from the second agent in Block S130 to proceed with transfer based on: the first compliance state and the third compliance state fulfilling a first compliance state requirement associated with the second agent; and the first risk score, in the first risk profile, and the third risk score, in the third risk profile, falling below a first threshold score associated with the second agent.

Similarly, the computer system can receive confirmation from the first agent in Block S140 to proceed with transfer of the first virtual asset based on: the second compliance state and the fourth compliance state fulfilling a second compliance state requirement associated with the first agent; and the second risk score, in the second risk profile, and the fourth risk score, in the fourth risk profile, falling below a second threshold score associated with the first agent.

In this implementation, the computer system can receive confirmation from an agent (e.g., the first VASP, the second VASP) in response to each compliance state associated with the subset of subsidiary agents fulfilling a corresponding compliance state requirement (e.g., compliant, regulated) and in response to each risk profile associated with the subset of subsidiary agents fulfilling a target threshold risk profile.

In another implementation, the second VASP can receive the fourth message including the fifth set of transaction information.

For example, the second VASP can receive the fifth set of transaction information including: the virtual asset type; the amount (or value) of the virtual asset to transfer; the first identifier of the sender; the first blockchain address; the second identifier of the first VASP; the third identifier of the recipient; the fourth identifier of the second VASP; the fifth identifier of the first digital wallet service; the sixth identifier of the second digital wallet service; a first subset of regulatory compliance states (e.g., the first regulatory compliance state of the first VASP, the second regulatory compliance state of the first digital wallet service, the third regulatory compliance state of the second VASP, the fourth regulatory compliance state of the second digital wallet service); and a first subset of risk profiles (e.g., the first risk profile of the first blockchain address, the second risk profile of the first VASP the third risk profile of the first digital wallet service, the fourth risk profile of the second VASP, the fifth risk profile of the sender, the sixth risk profile of the recipient, the seventh risk profile of the second digital wallet service).

In this implementation, the second VASP accesses a first policy defining a first target regulatory compliance state (e.g., regulated and compliant). In response to each regulatory compliance state in the first subset of regulatory compliance states corresponding to the first target regulatory compliance state, the second VASP authorizes the transfer of the virtual asset. More specifically, the second VASP can: generate a sixth message specifying authorization of the transfer of the virtual asset by the second VASP; and transmit the sixth message to the first subset of agents and/or the management platform.

Additionally or alternatively, the second VASP can access a second policy defining a first target risk profile. In response to each risk profile in the first subset of risk profiles fulfilling the first target risk profile, the second VASP can authorize the transfer of the virtual asset.

However, in response to a regulatory compliance state in the first subset of regulatory compliance states differing from the first target regulatory compliance state, the second VASP can reject the transfer of the virtual asset. More specifically, the second VASP can: generate a seventh message specifying rejection of the transfer of the virtual asset by the second VASP; and transmit the seventh message to the first subset of agents and/or the management platform.

Additionally or alternatively, in response to a risk score in the first subset of risk profiles exceeding the first risk score threshold, the second VASP can reject the transfer of the virtual asset.

The system can repeat the foregoing methods and techniques for each agent in the set of agents.

For example, the second digital wallet service can: receive the fifth set of transaction information and the sixth message specifying authorization of the transfer of the virtual asset by the second VASP; and access a third policy specifying authorization of a target virtual asset transfer in response to authorization of the target virtual asset transfer by the second VASP.

In this example, based on the third policy, the second digital wallet service can authorize the transfer of the first asset in response to the sixth message specifying authorization of the transfer of the virtual asset by the second VASP. More specifically, the second digital wallet service can: generate an eighth message specifying authorization of the transfer of the virtual asset by the second digital wallet service and including the second blockchain address; and transmit the eighth message to the first subset of agents and/or the management platform.

Alternatively, in response to receiving the seventh message specifying rejection of the transfer of the virtual asset by the second VASP, the second digital wallet service can reject the transfer of the first asset.

Accordingly, each agent in the first subset of agents can independently authorize (or reject) the transfer of the virtual asset based on policies associated with the agent. Additionally, the second digital wallet service can communicate the second blockchain address (e.g., the beneficiary or destination address of the transfer) to the first VASP (e.g., the originating agent of the transfer) in response to authorization of the transfer by the second digital wallet service and the second VASP, thereby mitigating risk of fraudulent and/or criminal activity by the second VASP and the second digital wallet service.

6.4.3 Trusted Counterparties

In one variation, the computer system can, in response to the first compliance state and the third compliance state fulfilling the first compliance state requirement, the first risk profile and the third risk profile fulfilling the first risk profile threshold, the second compliance state and the fourth compliance state fulfilling the second compliance state requirement, and the second risk profile and the fourth risk profile fulfilling the second risk profile threshold: identify the first agent and the second agent as trusted counterparties in Block S160; and generate a communication channel between the first agent and the second agent in Block S162.

In this variation, the computer system can, in response to receiving a first transaction request, access a set of approved identifiers associated with previous transactions between a first agent and a second agent in Block S164; and, in response to identifying absence of the sender identifier from the set of approved identifiers, implement methods and techniques as described herein to characterize a compliance state and characterize a risk profile for the first agent (and/or the second agent).

For example, in response to receiving approval from the first agent and the second agent, the management platform can generate a communication channel—between the first agent and the second agent—through which information (e.g., additional agent information, transaction information) may be exchanged.

In this example, the computer system can generate the communication channel including: an interface (e.g., a first application programming interface (hereinafter "API"), a first set of APIs) communicatively coupled to the first agent (e.g., via a communication link between the management platform/the computer system and the first agent); and a second interface (e.g., a second API, a second set of APIs) communicatively coupled to the second agent (e.g., via a second communication link between the management platform/the computer system and the second agent).

In another example, the computer system can execute methods and techniques described in U.S. patent application Ser. No. 18/949,310 to, during a first time period: access a first set of policies implemented by a first agent; access a second set of policies implemented by a second agent; identify the second agent as a candidate counterparty to the first agent based on correspondence between the first set of policies and the second set of policies; generate a first notification specifying the first set of policies; transmit the first notification to the second agent; generate a second notification specifying the second set of policies; transmit the second notification to the first agent; receive a first confirmation indicating the second agent as trusted by the first agent based on the second set of policies; receive a second confirmation indicating the first agent as trusted by the second agent based on the first set of policies; and generate a communication channel between the first agent and the second agent in response to receiving the first confirmation and the second confirmation. During a second time period, the computer system can: receive a transaction request from the first agent, the transaction request representing a transfer of a virtual asset from a first blockchain address associated with a first user identifier to a second blockchain address, and omitting the first user identifier from a list of sanctioned user identifiers; identify the second agent as associated with the transaction request; transmit the transaction request to the second agent via the communication channel; receive a transaction authorization from the second agent, the transaction authorization indicating acceptance of the transfer of the virtual asset by the second agent based on absence of the first user identifier from the list of sanctioned user identifiers and including the second blockchain address; and transmit the transaction authorization to the first agent via the communication channel.

Therefore, in this variation, the computer system can enable the first agent and the second agent to share information—securely and according to a protocol(s) compatible with these agents—prior to runtime execution of a transaction request, thereby reducing latency and communication overhead during runtime execution of the transaction request.

6.5 Transaction

Generally, the computer system can record the transaction and/or transmit the transaction to a distributed network of nodes for commitment to a block of a blockchain.

In one implementation, in response to receiving the recipient blockchain address, the first VASP and/or the first digital wallet service executes the foregoing methods and techniques to authorize (or reject) the transfer based on the sixth set of transaction information.

In one example, the first VASP authorizes the transfer of the virtual asset in response to the ninth risk profile fulfilling a second target risk profile threshold defined in a fourth policy associated with the first VASP.

In another example, the first digital wallet service authorizes the transfer of the virtual asset in response to authorization of the transfer of the virtual asset by the first VASP.

In another implementation, in response to authorizing the transfer of the virtual asset, the first digital wallet service and/or the first VASP: generates a transaction representing the transfer of the virtual asset from the first blockchain address to the second blockchain address; and submits the transaction to a distributed network of nodes for commitment in a block of a blockchain.

6.5.1 Management Platform Signature

In one implementation, the management platform: accesses the transaction representing the transfer of the virtual asset, such as receiving the transaction from the first digital wallet service; and updates the transaction—to include a signature associated with the management platform—as a signed transaction. More specifically, the management platform can: access a group of policies associated with the first subset of agents; and update the transaction—including the signature associated with the management platform—in response to the sixth set of transaction information complying with the group of policies.

In this implementation, in response to updating the transaction as the signed transaction, the management platform transmits the signed transaction to the first digital wallet service, which may then transmit the signed transaction to the distributed network of nodes for commitment to a block of the blockchain. Additionally or alternatively, the management platform can transmit the signed transaction to the distributed network of nodes for commitment to the block of the blockchain.

7. TRANSACTION REJECTION

In one variation, the computer system can generate or receive a rejection of the transfer request from a beneficiary agent in the set of agents, such as based on a compliance state of the originating agent (or a subsidiary agent) failing to fulfil a compliance state requirement, and/or in response to a risk score of the originating agent exceeding a threshold risk score established by the beneficiary agent in Block S150.

For example, the computer system can: implement methods and techniques as described herein to responsively generate and pass messages between a first agent and a second agent involved in a transaction; receive a third message from the second agent, the third message including a rejection of the request in response to the first compliance state of the first agent failing to fulfill a compliance state threshold associated with the second agent; generating a fourth message including the rejection and omitting a recipient blockchain address associated with the recipient identifier; and transmitting the fourth message to the first agent.

In one implementation, in response to receiving a transaction rejection, the computer system can append a blacklist, associated with the beneficiary VASP, with the sender blockchain address and/or an identifier associated with the originating VASP, to thus block (or otherwise prevent) additional transaction requests from this sender.

Additionally or alternatively, in a similar example, the computer system can: receive a message from the first agent, the message including a rejection of the request in response to a risk score of the second agent exceeding a threshold score associated with the first agent; generate a second message including the rejection and omitting the sender blockchain address; and transmit the second message to the third agent.

Accordingly, the computer system can receive transaction rejections from counterparty agents in response to a compliance state and/or a risk profile (or contents of the risk profile) failing to fulfill a threshold established by the counterparty agent.

8. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

for each agent in a set of agents:

accessing a set of policies implemented by the agent;

accessing a set of transaction characteristics of transactions associated with the agent;

characterizing a compliance state of the agent based on the set of policies; and characterizing a risk profile of the agent based on the set of transaction characteristics;

receiving a first message from a first agent in the set of agents, the first message comprising a request to transfer a first virtual asset to a first recipient identifier from a sender identifier associated with a sender blockchain address;

identifying a second agent, in the set of agents, associated with the first recipient identifier;

identifying a first subset of agents, in the set of agents, affiliated with the first agent; and identifying a second subset of agents, in the set of agents, affiliated with the second agent;

generating a second message comprising:

the request;

the sender blockchain address;

a first compliance state of the first agent;

a first risk profile of the first agent;

a first set of compliance states of each agent in the first subset of agents; and a first set of risk profiles of each agent in the first subset of agents;

transmitting the second message to the second agent;

receiving confirmation from the second agent to proceed with transfer of the first virtual asset based on:

each compliance state in the first set of compliance states fulfilling a second compliance state requirement; and each risk profile in the first set of risk profiles fulfilling a second risk profile requirement;

in response to receiving confirmation from the second agent to proceed with transfer of the first virtual asset based on the first compliance state and the first risk profile, generating a third message comprising:

the request;

an authorization of transfer of the first virtual asset by the second agent;

a second compliance state of the second agent;

a second risk profile of the second agent;

a second set of compliance states of each agent in the second subset of agents; and a second set of risk profiles of each agent in the second subset of agents;

transmitting the third message to the first agent;

receiving confirmation from the first agent to proceed with transfer of the first virtual asset based on:

each compliance state in the second set of compliance states fulfilling a first compliance state requirement; and each risk profile in the second set of risk profiles fulfilling a first risk profile requirement; and in response to receiving confirmation from the first agent to proceed with transfer of the first virtual asset based on the second compliance state and the second risk profile, retrieving a first recipient blockchain address associated with the first recipient identifier; and transmitting the second blockchain address to the first agent to enable transfer of the first virtual asset from the sender blockchain address to the first recipient blockchain address.

2. The method of claim 1, wherein receiving the first message comprises receiving the first message comprising the request to transfer the first virtual asset to the first recipient identifier, the first message omitting the first recipient blockchain address.

3. The method of claim 1, further comprising:

extracting the first compliance state requirement and the first risk profile requirement from a first set of policies associated with the first agent;

extracting the second compliance state requirement and the second risk profile requirement from a second set of policies associated with the second agent;

in response to each compliance state in the second set of compliance states fulfilling a first compliance state requirement and each risk profile in the second set of risk profiles fulfilling a first risk profile requirement, serving a first recommendation of approval of the request to the first agent; and in response to each compliance state in the first set of compliance states fulfilling a second compliance state requirement and each risk profile in the first set of risk profiles fulfilling a second risk profile requirement, serving a second recommendation of approval of the request to the second agent.

4. The method of claim 1, further comprising:

generating a transaction hash based on a cryptographic hash function;

generating a record of the transaction representing:

completion of the transfer of the virtual asset from the sender blockchain address to the first recipient blockchain address; and the transaction hash; and transmitting the record of the transaction to a distributed network of nodes for commitment to a block of a blockchain.

5. The method of claim 1, further comprising:

receiving a fourth message comprising a second request to transfer a second virtual asset to a second recipient identifier from the sender identifier;

identifying a third agent associated with the second recipient identifier;

generating a fifth message comprising:

the second request;

the sender blockchain address;

the first compliance state of the first agent; and the first risk profile of the first agent;

transmitting the fifth message to the third agent;

receiving a sixth message from the third agent, the sixth message comprising a rejection of the second request in response to the first compliance state failing to fulfill a compliance state requirement associated with the third agent;

generating a seventh message comprising the rejection and omitting a second recipient blockchain address associated with the second recipient identifier; and transmitting the seventh message to the first agent.

6. The method of claim 1, further comprising:

receiving a fourth message comprising a second request to transfer a second virtual asset to a second recipient identifier from the sender identifier;

identifying a third agent, in the set of agents, associated with the second recipient identifier;

generating a fifth message comprising:

the second request;

the first compliance state of the first agent; and the first risk profile of the first agent;

transmitting the fifth message to the third agent;

in response to receiving confirmation from the third agent to proceed with transfer of the second virtual asset based on the first compliance state and the first risk profile, generating a sixth message comprising:

the second request;

an authorization of transfer of the second virtual asset by the third agent;

a third compliance state of the third agent; and a third risk profile of the third agent;

transmitting the sixth message to the first agent;

receiving a seventh message from the first agent, the seventh message comprising a rejection of the second request in response to the third risk profile failing to fulfil a risk profile requirement associated with the first agent;

generating an eighth message comprising the rejection and omitting the sender blockchain address; and transmitting the eighth message to the third agent.

7. The method of claim 1:

further comprising, for each agent in the set of agents:

identifying a jurisdiction associated with the agent;

accessing a list of sanctioned jurisdictions;

in response to identifying the jurisdiction in the list of sanctioned jurisdictions, flagging the agent as a high risk agent; and wherein characterizing the risk profile for the agent comprises characterizing the risk profile further based on the jurisdiction associated with the agent.

8. The method of claim 1, further comprising:

receiving a fourth message from the first agent in the set of agents, the fourth message comprising a second request to transfer a second virtual asset to a second recipient identifier from the sender identifier;

identifying a third agent, in the set of agents, associated with the second recipient identifier;

in response to receiving the fourth message:

accessing a time difference between characterization of the first compliance state of the first agent and a time of receipt of the fourth message; and

in response to the time difference exceeding a threshold time difference, characterizing a third compliance state of the first agent;

generating a fifth message comprising:
the second request;
the sender blockchain address; and
the third compliance state of the first agent;

in response to the third compliance state failing to fulfil a first compliance state requirement, omitting the first risk profile from the fifth message;

transmitting the fifth message to the third agent;

receiving a sixth message from the third agent, the sixth message comprising a rejection of the second request in response to the third compliance state failing to fulfill a second compliance state requirement associated with the third agent;

generating a seventh message comprising the rejection and omitting a second recipient blockchain address associated with the second recipient identifier; and transmitting the seventh message to the first agent.

9. The method of claim 1:

wherein characterizing the compliance state of the agent comprises characterizing the compliance state in response to entering a first time window and prior to receiving the first message from the first agent;

wherein characterizing the risk profile of the agent comprises characterizing the risk profile in response to the compliance state fulfilling a compliance requirement; and further comprising:
receiving a fourth message from a third agent in the set of agents, the fourth message comprising a second request to transfer a second first virtual asset to a second recipient identifier from a second sender identifier associated with a second sender blockchain address hosted by the third agent;
identifying a fourth agent, in the set of agents, associated with the second recipient identifier;
accessing a third compliance score for the third agent in the set of agents; and
in response to the third compliance score failing to fulfil the compliance requirement:
cancelling characterization of a third risk profile for the third agent;
rejecting the second request; and
withholding a second recipient blockchain address associated with the second recipient identifier from the third agent.

10. The method of claim 1, further comprising, for the first agent:

receiving a notification of a policy update from the first agent;

in response to receiving the notification, characterizing a third compliance state based on the policy update;

receiving a fourth message comprising a second request to transfer a second virtual asset to a second recipient identifier from the sender identifier associated with the first agent;

identifying a third agent, in the set of agents, associated with the second recipient identifier;

generating a fifth message comprising:
the second request;
the sender blockchain address;
the third compliance state of the first agent; and
the first risk profile of the first agent;

transmitting the fifth message to the third agent;

in response to receiving confirmation from the third agent to proceed with transfer of the second virtual asset based on the third compliance state and the first risk profile, generating a sixth message comprising:
the second request;
an authorization of transfer of the second virtual asset by the third agent;
a fourth compliance state of the third agent; and
a third risk profile of the third agent;

transmitting the sixth message to the first agent;

in response to receiving confirmation from the first agent to proceed with transfer of the second virtual asset, retrieving a second recipient blockchain address associated with the second recipient identifier; and transmitting the second recipient blockchain address to the first agent to enable transfer of the second virtual asset from the sender blockchain address to the second recipient blockchain address.

11. A method comprising:

receiving a first message from a first agent, the first message comprising a request to transfer a first virtual asset to a first recipient identifier, associated with a second agent, from a sender identifier associated with a sender blockchain address;

for the first agent:
identifying a first subset of agents affiliated with the first agent;
accessing a first set of policies implemented by the first agent;
accessing a third set of policies implemented by the first subset of agents;
accessing a first set of transaction characteristics of transactions associated with the first agent;
accessing a third set of transaction characteristics of transactions associated with the first subset of agents;
characterizing a first compliance state of the first agent based on the first set of policies and the third set of policies;
accessing a set of transactions associated with the first agent during a target time interval;
extracting the first set of transaction characteristics from the set of transactions;
calculating a proportion of transactions, in the set of transactions, occurring during the target time interval based on the set of transaction characteristics; and
calculating a first risk score in response to the proportion of transactions exceeding a threshold proportion of transactions;
characterizing a first risk profile, comprising the first risk score, of the first agent based on:
the first set of transaction characteristics; and
the third set of transaction characteristics;

generating a second message representing:
the request;
the sender blockchain address;
the first compliance state of the first agent; and
the first risk profile of the first agent;

transmitting the second message to the second agent;

receiving confirmation from the second agent to proceed with transfer of the first virtual asset based on:
the first compliance state fulfilling a first compliance state requirement; and
the first risk profile fulfilling a first risk profile requirement;

for the second agent:
identifying a second subset of agents affiliated with the second agent;

accessing a second set of policies implemented by the second agent;

accessing a fourth set of policies implemented by the second subset of agents;

accessing a second set of transaction characteristics of transactions associated with the second agent;

accessing a fourth set of transaction characteristics of transactions associated with the second subset of agents;

characterizing a second compliance state of the second agent based on the second set of policies and the fourth set of policies; and characterizing a second risk profile of the second agent based on the second set of transaction characteristics and the fourth set of transaction characteristics, the second risk profile including a second risk score;

generating a third message representing:

the request;

an authorization of transfer of the first virtual asset by the second agent;

the second compliance state of the second agent; and the second risk profile of the second agent;

transmitting the third message to the first agent; and in response to receiving confirmation from the first agent to proceed with transfer of the first virtual asset based on based on the second compliance state and the fourth compliance state fulfilling a second compliance state requirement and the second risk profile and the fourth risk profile fulfilling a second risk profile requirement retrieving a first recipient blockchain address associated with the first recipient identifier; and transmitting the first recipient blockchain address to the first agent to enable transfer of the first virtual asset from the sender blockchain address to the first recipient blockchain address.

12. The method of claim 11, further comprising:

receiving a fourth message from the first agent, the fourth message comprising a second request to transfer a second virtual asset to a second recipient identifier, associated with a third agent, from the sender identifier;

in response to receiving the fourth message, retrieving the first compliance state of the first agent;

in response to the first compliance state of the first agent failing to fulfil a compliance state requirement, omitting characterizing a third risk profile for the first agent;

generating a fifth message representing:

the second request;

the sender blockchain address; and the first compliance state of the first agent;

transmitting the fifth message to the third agent;

receiving a sixth message from the third agent, the sixth message comprising a rejection of the second request in response to the first compliance state failing to fulfill a second compliance state threshold associated with the third agent;

generating a seventh message comprising the rejection and omitting a second recipient blockchain address associated with the second recipient identifier; and transmitting the seventh message to the first agent.

13. The method of claim 11, further comprising:

receiving a fourth message from the first agent, the fourth message comprising a second request to transfer a second virtual asset to a second recipient identifier, associated with a third agent, from the sender identifier;

in response to receiving the fourth message, retrieving the first risk profile of the first agent;

in response to the first risk profile fulfilling a target risk profile threshold, omitting characterizing the first compliance state of the first agent;

generating a fifth message representing:

the second request;

the sender blockchain address; and the first risk profile of the first agent;

transmitting the fifth message to the third agent;

receiving a sixth message from the third agent, the sixth message comprising a rejection of the second request in response to the first risk profile failing to fulfil a second target risk profile threshold associated with the third agent;

generating a seventh message comprising the rejection and omitting a second recipient blockchain address associated with the second recipient identifier; and transmitting the seventh message to the first agent.

14. The method of claim 11:

further comprising in response to receiving the first message, accessing a set of approved identifiers associated with previous transactions between the first agent and the second agent; and wherein generating the second message comprises generating the second message in response to identifying absence of the sender identifier from the set of approved identifiers.

15. The method of claim 11:

wherein generating the second message comprises:

encrypting the second message according to a target encryption protocol;

wherein transmitting the second message to the second agent comprises transmitting the second message, the second message encrypted according to the target encryption protocol;

wherein generating the third message comprises encrypting the third message according to a target encryption protocol;

wherein transmitting the third message to the first agent comprises transmitting the third message, the third message encrypted according to the target encryption protocol; and wherein transmitting the first recipient blockchain address to the first agent comprises transmitting a fourth message to the first agent, the fourth message:

comprising the first recipient blockchain address; and encrypted according to the target encryption protocol.

16. The method of claim 11:

further comprising:

in response to identifying absence of the second set of policies, generating a fourth message comprising a second request for the second set of policies;

transmitting the fourth message to a set of agents; and receiving a fifth message, from a third agent in the set of agents, the fifth message comprising the second set of policies; and wherein accessing the second set of policies comprises accessing the second set of policies from the fifth message.

* * * * *